No. 812,994. PATENTED FEB. 20, 1906.
J. HEIDENKAMP.
APPARATUS FOR MAKING WIRE GLASS.
APPLICATION FILED MAY 5, 1905.

WITNESSES:
INVENTOR
Joseph Heidenkamp
Atty's

UNITED STATES PATENT OFFICE.

JOSEPH HEIDENKAMP, OF SPRINGDALE, PENNSYLVANIA.

APPARATUS FOR MAKING WIRE-GLASS.

No. 812,994.　　　　　Specification of Letters Patent.　　　　Patented Feb. 20, 1906.

Application filed May 5, 1905. Serial No. 258,957.

*To all whom it may concern:*

Be it known that I, JOSEPH HEIDENKAMP, a resident of Springdale, in the county of Allegheny and State of Pennsylvania, have invented a new and useful Improvement in Apparatus for Making Wire-Glass; and I do hereby declare the following to be a full, clear, and exact description thereof.

My invention relates to apparatus for making wire-glass; and the object is to provide apparatus for this purpose which is simple in construction, which cannot get out of order, and which can be easily operated and readily changed to form glass of different thicknesses. The most serious difficulty encountered in the manufacture of wire-glass is in positioning the wire mesh at the center of the thickness of the plate or in such position that all portions thereof are equally distant from the surfaces of the plate. Numerous processes and various forms of apparatus have been heretofore devised for manufacturing wire-glass, and various expedients have been resorted to for the purpose of holding the glass tightly and with all portions thereof uniform distances from the surfaces of the plate. As far as I am aware this has not been satisfactorily accomplished, at least for such wire-glass as is desired shall afterward be ground and polished.

The object of my invention is to provide apparatus wherein the foregoing results are secured and which apparatus is simple and cheap of construction, easy of operation, which cannot get out of repair, and in which the wire fabric will be held absolutely tight and with all portions thereof the same distance from the surfaces of the finished plate.

To the accomplishment of the foregoing end my invention consists of the arrangement of parts hereinafter described and claimed.

Figure 1:
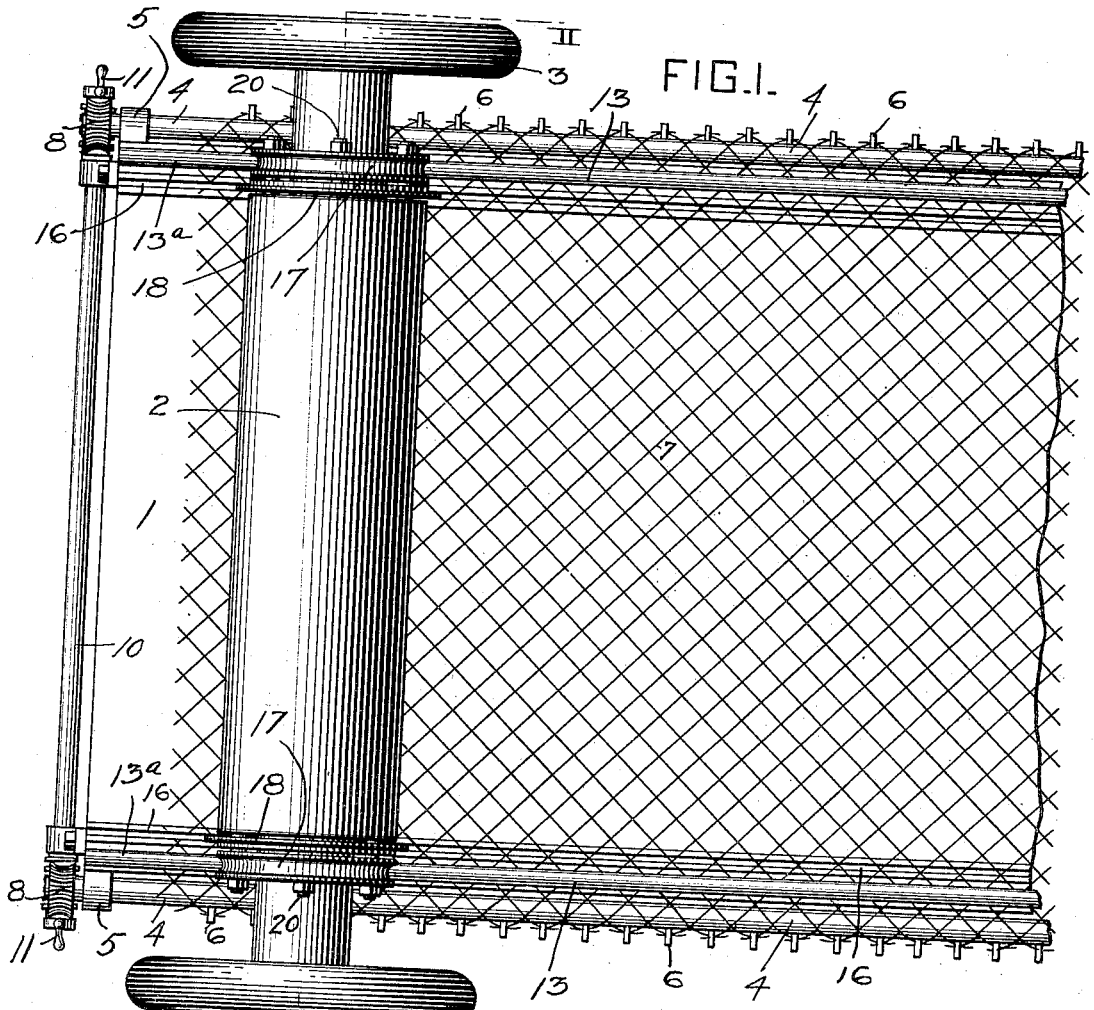
Figure 2:
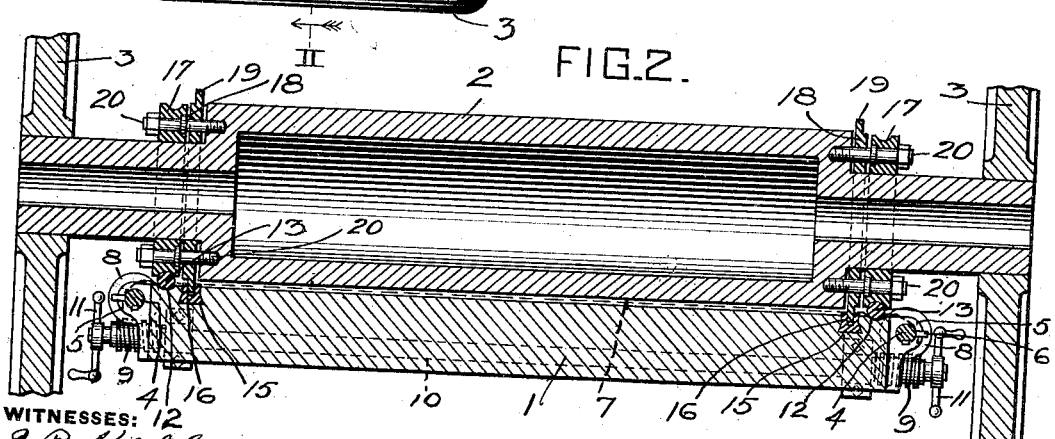

In the accompanying drawings, Figure 1 is a plan view of a portion of apparatus constructed according to my invention; and Fig. 2 is a cross-section thereof on the line II II, Fig. 1.

The apparatus embodying my invention is constructed and operates on the principle of well-known apparatus for manufacturing plate-glass. It comprises a casting-table 1, which may be of any well-known construction for making plate and similar glass. Coöperating with this table is a roller 2, which serves to press the glass down on the table and determines the thickness of the plate in the well-understood manner. The roller 2 may be made to travel along the table 1, or it may be stationary and the table made to travel underneath the roller, this being a matter of choice and will be readily understood, because both forms of apparatus are well known in plate-glass manufacture. As shown in the drawings, the roller is intended to travel along the table, being moved over the latter by any well-known mechanism—such, for instance, as the hand-wheels 3, secured to the ends of said roller.

One part of my invention relates to means for holding and tightening the wire mesh. This consists of a pair of shafts or rotatable bars 4, extending longitudinally of the table on each side and journaled in suitable bearings 5. Each of these bars or shafts is provided with a series of studs or hooks 6 or other devices adapted to engage and hold the opposite edges of the sheet of wire mesh 7. These shafts may be rotated in any suitable way, so as to roll the edges of the sheet of wire mesh thereon in order to tighten the latter. As shown in the drawings, each shaft is shown provided with a worm-wheel 8, having meshing therewith a worm 9, secured to a transverse shaft 10. The two worms on the shaft 10 are oppositely arranged, so that when said shaft is rotated the shafts 4 will be rotated in opposite directions, so as to move the studs 6 simultaneously away from or toward the table. Any suitable means may be used for rotating the shaft 10, the drawings showing ordinary cranks 11 for this purpose. It is obvious that only one shaft 4 need be employed, as the wire mesh may be secured at one edge to a fixed support or clamp and will be equally as well tightened by pulling on one of the edges thereof. I regard, however, the use of two shafts as preferable.

In the upper face of the table 1, adjacent to its opposite side edges, are grooves 12 for receiving bars 13, which act as tracks for the roller 2. These bars 13 are preferably of cylindrical form. They define the thickness of the finished plate and may therefore be employed in sets varying in size according to the desired thickness of plates to be formed. They rest on top of the wire mesh 7, thus confining the latter near its edges within the grooves 12, and as the roller 2 rests thereupon these bars will press the already-stretched fabric down into the grooves, and thus still further tighten or stretch said fabric and hold it very securely in place at the very moment when the metal is being rolled into place above and underneath the wire mesh. Inside of the grooves 12 the face of the table is provided with a pair of grooves 15, which preferably are of dovetailed form, as shown, and in which are removably fitted bars 16, which preferably are grooved or channeled, as shown. These bars 16 project above the surface of the table, and their upper edges form rests or supports for the wire mesh, thus defining the extent of the space between said wire mesh and the surface of the table. They may, therefore, like the bars 13, be employed in sets varying in size according to the desired thickness of plates to be formed.

Upon the hubs of the roller 2 at its opposite ends and in vertical alinement with the bars 13 are mounted bearing-sections 17, which rest and travel along the bars 13. These bearing-sections are grooved, as shown, so that the bars 13 will guide the roller 2 and keep it squarely across the table. Between the bearing-sections 17 and the body of the roller at both ends are arranged disks or collars 18, which are in vertical alinement with the bars 16 and are provided with annular projections 19, which travel in the channels or grooves formed in the bars 16. These projecting edges, together with the edges of the grooves in the bars 16, form cutters which sever the projecting edges of the wire mesh. I have shown the bearing-sections 17 and collars 18 formed separate from the body of the roller and fastened in place by means of screw-bolts 20. I prefer this construction in order that these parts may be readily removed and replaced. The cutting-disks are liable to wear, and hence need replacement, while by means of removable bearing-section 17 the thickness of the finished plate may be varied according to the diameter of these bearing-sections instead of by changing the bars 13. The same result might also be obtained by the use of annular bands or tires secured upon the treads of the bearing-sections 17. All such modifications will be apparent to those skilled in the art and may be employed or not, as desired. The batch of plastic glass will be confined against spreading sidewise by a gun of any well-known construction placed in front of the roller 2, as is the common practice in plate-glass manufacture.

In the use of my apparatus bars 16 of the desired size are inserted in the grooves 15. The sheet of wire mesh is then laid over the table, resting upon these bars 16, and its opposite edges are attached to the studs or hooks 6 on the shafts 4. Then by turning the shaft 10 the shafts 4 are turned in opposite directions, so as to move the hooks on the two shafts simultaneously away from the table, thus stretching the fabric uniformly and holding it in position. The bars 13 are then laid on top of the wire mesh and over the grooves 12. Short pieces 13ª are preferably placed at the end of the table beyond the end of the wire mesh, so as to serve as a rest for the roller 2. The roller is then moved into position, the bearing-sections 17 thereof resting upon the bars 13 and the edges of the disks 18 projecting down into the grooves in the bars 16. The gun will then be placed in front of the roller 2 and the batch of plastic glass poured upon the wire mesh and table between the walls of the gun and in front of the roller. The roller will then be moved forwardly over the table or the table backwardly under the roller, thus forming the finished sheet with the wire mesh incorporated therein. As the roller travels along the table it forces the bars 13 down into the grooves 12, thus stretching the fabric 7 still more tightly and holding it firmly in place and at the exact point and moment where and when the mesh is being embedded in the glass. The projecting edges of the disks 18, together with the edges of the grooved bars 16, shear off the protruding edges of the wire mesh.

The apparatus described is very simple and can be easily operated. There are no parts to get out of repair, and the wire mesh will be held perfectly tight and in such position that all portions thereof will be the same distance from the surfaces of the plate. Consequently plates manufactured on this apparatus are especially adapted for grinding and polishing and for other uses in which a uniformity in the position and shape of the mesh is necessary or desirable.

What I claim is—

1. In apparatus for making wire-glass, the combination of a casting-table and roller coöperating therewith, and securing means for the wire mesh at each side of said table and extending transversely to the roller-axis, one at least of said securing means being movable toward and from the edge of the table thereby to tighten the mesh.

2. In apparatus for making wire-glass, the combination of a casting-table and roller coöperating therewith, and securing means for the wire mesh at each side of said table and extending transversely to the roller-axis, the securing means at one side at least being rotatable thereby to tighten said mesh.

3. In apparatus for making wire-glass, the combination of a casting-table and a roller coöperating therewith, securing means for the wire meshing at each side of said table and extending transversely to the roller-axis, the securing means at one side at least being a rotatable shaft, a worm-wheel on said shaft, and a driven worm-wheel meshing with said worm-wheel.

4. In apparatus for making wire-glass, the combination of a casting-table and roller coöperating therewith, securing means for the wire mesh at each side of said table and extending transversely to the roller-axis, and means connecting said securing means and arranged to move the same simultaneously away from the table thereby to tighten the mesh.

5. In apparatus for making wire-glass, the combination of a casting-table and roller coöperating therewith, a series of studs or hooks extending transversely to the roller-axis at each side of the table for the attachment of the wire mesh, and a movable bar to which at least one series of said studs is attached thereby to tighten said mesh.

6. In apparatus for making wire-glass, the combination of a casting-table and roller coöperating therewith, a series of studs or hooks extending transversely to the roller-axis at each side of the table for the attachment of the wire mesh, and a rotatable shaft by which at least one series of said studs is carried.

7. In apparatus for making wire-glass, the combination of a casting-table and roller coöperating therewith, a rotary shaft at one side of said table and extending transversely to the roller-axis, means for the attachment of the mesh to said shaft, and means for holding the opposite edge of said wire mesh.

8. In apparatus for making wire-glass, the combination of a casting-table and roller coöperating therewith, a rotatable shaft at each side of the table and extending transversely to the roller-axis, means connecting said shafts and arranged to rotate the same simultaneously in opposite directions, and means for attaching wire mesh to said shafts.

9. In apparatus for making wire-glass, the combination of a casting-table and roller coöperating therewith, a rotatable shaft at each side of the table and extending transversely to the roller-axis, a driving-shaft geared to both of said side shafts and arranged to rotate the same in opposite directions, and means for attaching wire mesh to said side shafts.

10. In apparatus for making wire-glass, the combination of a casting-table provided with a groove near each side edge, holding means for wire mesh located at each side of the table outside of said grooves, bars adapted to be placed over said grooves and above the mesh, and a roller coöperating with the table and bearing on said bars.

11. In apparatus for making wire-glass, the combination of a casting-table provided with a groove near each side edge, securing means for the wire mesh located outside of said grooves, bars adapted to be placed over said grooves and above the mesh, and a roller coöperating with the table and provided with bearing-grooves traveling on said bars whereby to stretch the wire mesh and hold the roller squarely across the table.

12. In apparatus for making wire-glass, the combination of a casting-table provided with a groove near each side edge, means for securing wire mesh along one edge of the table outside the groove, a rotatable shaft on the opposite edge of the table outside the groove, means for securing the wire mesh to said rotatable shaft, bars adapted to be placed over said grooves and above said mesh, and a roller coöperating with the table and bearing on said bars.

13. In apparatus for making wire-glass, the combination of a casting-table, cutting-shoulders on said table along both sides, securing means for the wire mesh located outside of said cutting-shoulders, a roller coöperating with said table, and cutting-disks on said roller coöperating with the cutting-shoulders on the table.

14. In apparatus for making wire-glass, the combination of a casting-table and coöperating roller, bars provided with cutting-shoulders placed along the edges of the table, securing means for wire mesh located outside of said bars, and cutting-disks on said roller coöperating with the shoulders on said bars.

15. In apparatus for making wire-glass, the combination of a casting-table provided with a groove near each side edge, changeable bars located inside of said grooves and adapted to support the wire mesh and forming cutting-shoulders, securing means for the wire mesh located outside of said grooves, changeable bars adapted to be placed over said grooves and on top of the mesh, and a roller coöperating with the table and bearing on the last-named bars and having cutting-disks coöperating with the shoulders on the cutting-bars.

16. In apparatus for making wire-glass, the combination of a casting-table provided with a groove near each side edge, changeable bars located inside of said grooves and adapted to support the wire mesh, securing means for the wire mesh located outside of said grooves, changeable bars adapted to be placed over said grooves and on top of the mesh, and a roller coöperating with the table and bearing on the last-named bars.

In testimony whereof I, the said JOSEPH HEIDENKAMP, have hereunto set my hand.

JOSEPH HEIDENKAMP.

Witnesses:
 F. W. WINTER,
 ROBERT C. TOTTEN.